(12) United States Patent
Tian et al.

(10) Patent No.: US 6,766,020 B1
(45) Date of Patent: Jul. 20, 2004

(54) SYSTEM AND METHOD FOR COMFORT NOISE GENERATION

(75) Inventors: Wenshun Tian, Rolling Meadows, IL (US); Youhong Lu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 533 days.

(21) Appl. No.: 09/792,826

(22) Filed: Feb. 23, 2001

(51) Int. Cl.$^7$ ............................................. H04M 1/00
(52) U.S. Cl. ............................ 379/406.05; 379/406.01
(58) Field of Search ..................... 379/406.01, 406.05, 379/406.08, 406.03, 406.07, 406.16

(56) References Cited

U.S. PATENT DOCUMENTS

| | | | |
|---|---|---|---|
| 6,064,873 A | 5/2000 | Eriksson et al. | ............ 455/403 |
| 6,195,430 B1 * | 2/2001 | Eriksson et al. | ....... 379/406.05 |
| 6,563,803 B1 * | 5/2003 | Lee | ....................... 379/406.05 |

OTHER PUBLICATIONS

Gunter Schmer, "*DTMF Tone Generation And Detection: An Implementation Using the TMS320C54x*", Texas Instruments, May 2000, pp. 1–19.

Augustine H. Gary, Jr. et al., "*Distance Measures For Speech Processing*", IEEE Transactions on Acoustics, Speech, And Signal Processing, vol. Assp.–24, No. 5, Oct. 1976, pp. 380–391.

International Telecommunication Union, "*Digital Network Echo Cancellers*", G.168, Apr. 2000, pp. 1–92.

International Telecommunication Union, "*Dual Rate Speech Coder For Multimedia Communications Transmitting At 5.3 And 6.3 kbits/s*", G.723.1, Mar. 1996, pp. i–27.

International Telecommunication Union, "*Coding Of Speech At 8kbit/s Using Conjugate–Structure Algebraic–Code–Excited Linear–Prediction (CS–ACELP)*", G–729, Mar. 1996, I–33.

* cited by examiner

*Primary Examiner*—Minsun Oh Harvey
*Assistant Examiner*—Jefferey Harold
(74) *Attorney, Agent, or Firm*—McDonnell Boehnen Hulbert & Berghoff

(57) ABSTRACT

A system for creating a comfort noise signal, said system includes a clipping circuit, a comfort noise generator, and a switch. The clipping circuit receives a near-end signal, a far-end signal and a residual signal. The clipping circuit determines the power of the far-end signal, the power of the near-end signal and the power of the residual signal. The clipping circuit determines the ratio of the power of the near-end signal to the residual signal and whether the ratio is less than a predetermined threshold. A comfort noise determination block is coupled to the residual signal and selectively forms a comfort noise signal. A switch is coupled to the comfort noise determination block and the clipping circuit. The switch is activated to transmit the comfort noise signal whenever the ratio of the power of the near-end signal to the residual signal is less than a predetermined threshold.

24 Claims, 5 Drawing Sheets

SYSTEM AND METHOD FOR COMFORT NOISE GENERATION

FIELD OF THE INVENTION

The invention relates to the creation of a comfort noise signal. Specifically, the invention relates to a method and system of creating a comfort noise signal in conjunction with an echo canceller.

BACKGROUND OF THE INVENTION

One consequence of using various types of circuits to couple different types of connections together is the creation of echoes. That is, speech may be reflected by a circuit back to a speaker, causing the speaker to hear his or her own voice.

For example, a near-end device may create a signal ("a near-end signal") that is transmitted to a far-end receiver. The far-end receiver may send a signal ("a far-end signal") back to the near-end device. The far-end signal may include an echo or a spoken reply message, for example. It is desirable to eliminate the effects of echoes. In order to eliminate the effect of echoes, a line echo canceller (LEC) may be used. The echo canceller may create an echo estimate and may subtract the estimate from the near-end signal to create a residual signal.

Besides echoes, another condition that occurs in modern telecommunication systems is the transmission of silence on a line when two speakers are engaged in a conversation. The silence may make one of the speakers believe that the connection between the two speakers no longer exists due to the Non-Linear Processing (NLP) of the LEC. To eliminate this undesirable effect, comfort noise insertion (CNI) may be used to insert background noise onto the line, when silence would normally be present. Inserting the comfort noise in the line has the desirable effect of making each of the speakers believed the line is still connected.

Comfort noise generation may use a nonlinear processing (NLP) scheme to keep a conversation line "alive" when NLP is activated. As required in Test No. 9 of G. 168 (2000), the generated comfort noise should match the background noise in both frequency content and power level. The changes in the level over time of the inserted comfort noise should match as closely as possible, the level changes that are occurring in the background noise.

ITU-T G.168 highlights the test requirements for comfort noise insertion CNI. CNI is popularly used in CELP vocoders such as those conforming to the ITU-T G.723.1 and G.729 protocols.

SUMMARY OF THE INVENTION

The present invention relates to the creation of a comfort noise signal. The present invention advantageously creates a comfort noise signal in conjunction with an echo cancellor. In one aspect of the present invention, a clipping circuit is used to determine when to create a comfort noise signal (and use this signal as an output). In another aspect of the present invention, linear predictive coding (LPC) coefficients are used to model the comfort noise signal and a background power tracking circuit is used to update these coefficients.

In one embodiment of the present invention, a system for forming a comfort noise signal may include a clipping circuit, a comfort noise determination block, and a switch. The clipping circuit may receive a near-end signal, i.e., the near-end signal+echo, a far-end signal and a residual signal. After receiving the signals, the clipping circuit may determine the power of the far-end signal, the near-end signal, and the residual signal. The clipping circuit may determine the ratio of the power of said near-end signal to the residual signal and whether the ratio is less than a predetermined threshold.

The comfort noise determination block may include a LPC analysis module, a synthesis module, a white noise generator, and a scaling module. The comfort noise determination block may be coupled to the residual signal and the far-end signal. The comfort noise determination block may selectively form a comfort noise signal. The switch may be coupled to the comfort noise determination block and the clipping circuit. The switch may be activated to transmit the comfort noise signal whenever the ratio of the power of said the near-end signal to the residual signal is less than a predetermined threshold.

In another embodiment, a second threshold is chosen and if the ratio of powers is not less than the first threshold but less than the second threshold, the residual signal may be attenuated and the attenuated signal used as an output. In yet another embodiment, if neither threshold is met, the residual signal may be used as the output of the system.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
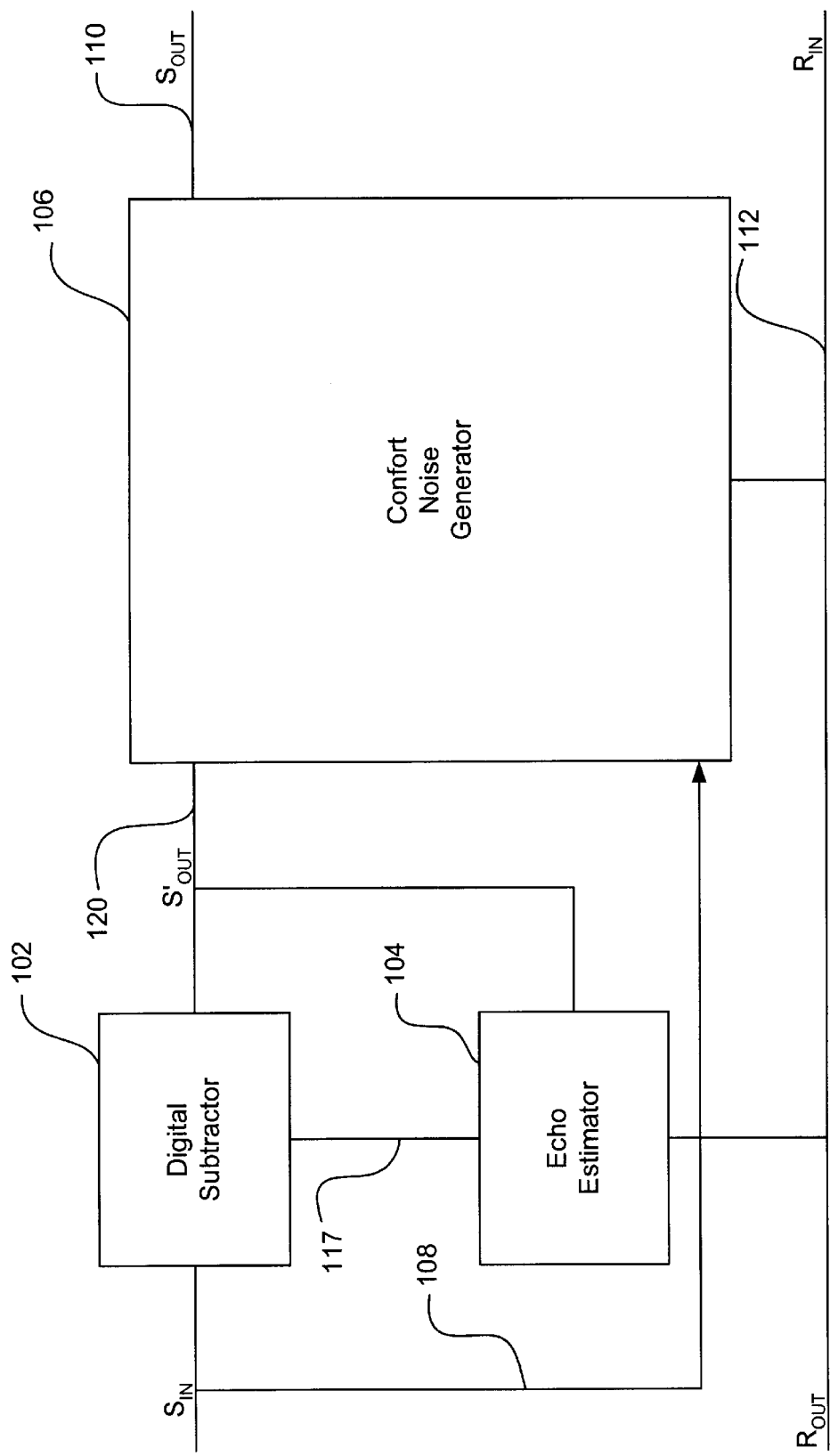
FIG. 1 is a diagram illustrating a preferred embodiment of the system for comfort noise generation in accordance with the present invention.

Referring now to FIG. 1, a system for generating a comfort noise signal includes a digital subtractor 102, an echo estimator 104, and a comfort noise generator 106. A near-end signal 108 is coupled to the digital subtractor 102 and the comfort noise generator 106. The digital subtractor 102 produces a residual signal 120. The echo estimator 104 produces an echo estimation signal 117. A far-end signal 112 is coupled to the echo estimator 104 and the comfort noise generator 106.

The echo estimator 104 creates an echo estimation signal 117 using the far-end signal 112 and the residual signal 120. Specifically, the digital subtractor 102 subtracts the echo estimation signal 117 from the near-end signal 108 to produce the residual signal 120.

The comfort noise generator 106 receives the residual signal 120, the far-end signal 112 and the near-end-signal 108 and may produce a comfort noise signal at the output of the comfort noise generator 106. Alternatively, the comfort noise generator 106 may attenuate the residual signal 120 and output the attenuated signal or simply output the residual signal.

In operation, the digital subtractor 102 and the comfort noise generator 106 receive the near-end signal 108. The echo estimator 104 receives a far-end signal 112 and the residual signal 120. The echo estimator 104 creates an echo estimation signal 117. For example, the echo estimator 104 may use a Least Mean Square (LMS) algorithm to create the echo estimate. The digital subtractor 102 may receive the echo estimate and subtract the echo estimate from the near-end signal 108 to create the residual signal 120.

The comfort noise generator 106 may track the power levels of the near-end signal 108, the far-end signal 112, and the residual signal 120 ("the power levels") and create an output signal 110. The comfort noise generator 106 may use this information to determine whether to create a comfort noise signal and use this as the output signal. The comfort noise generator 106 may also use this information to attenuate the residual signal and use the residual signal as the output signal. The comfort noise generator 106 may also use this information to decide to use the residual signal itself as the output signal.

The decision as to whether to output the comfort noise signal, an attenuated residual signal, or the residual signal may be made based upon a variety of factors. In one particularly convenient embodiment, the decision may be based upon comparing the power ratios of the power levels to predetermined thresholds and determining whether these ratios are less than predetermined thresholds. This comparison process may determine whether the near-end and far-end signals are noise or speech signals.

Figure 2:
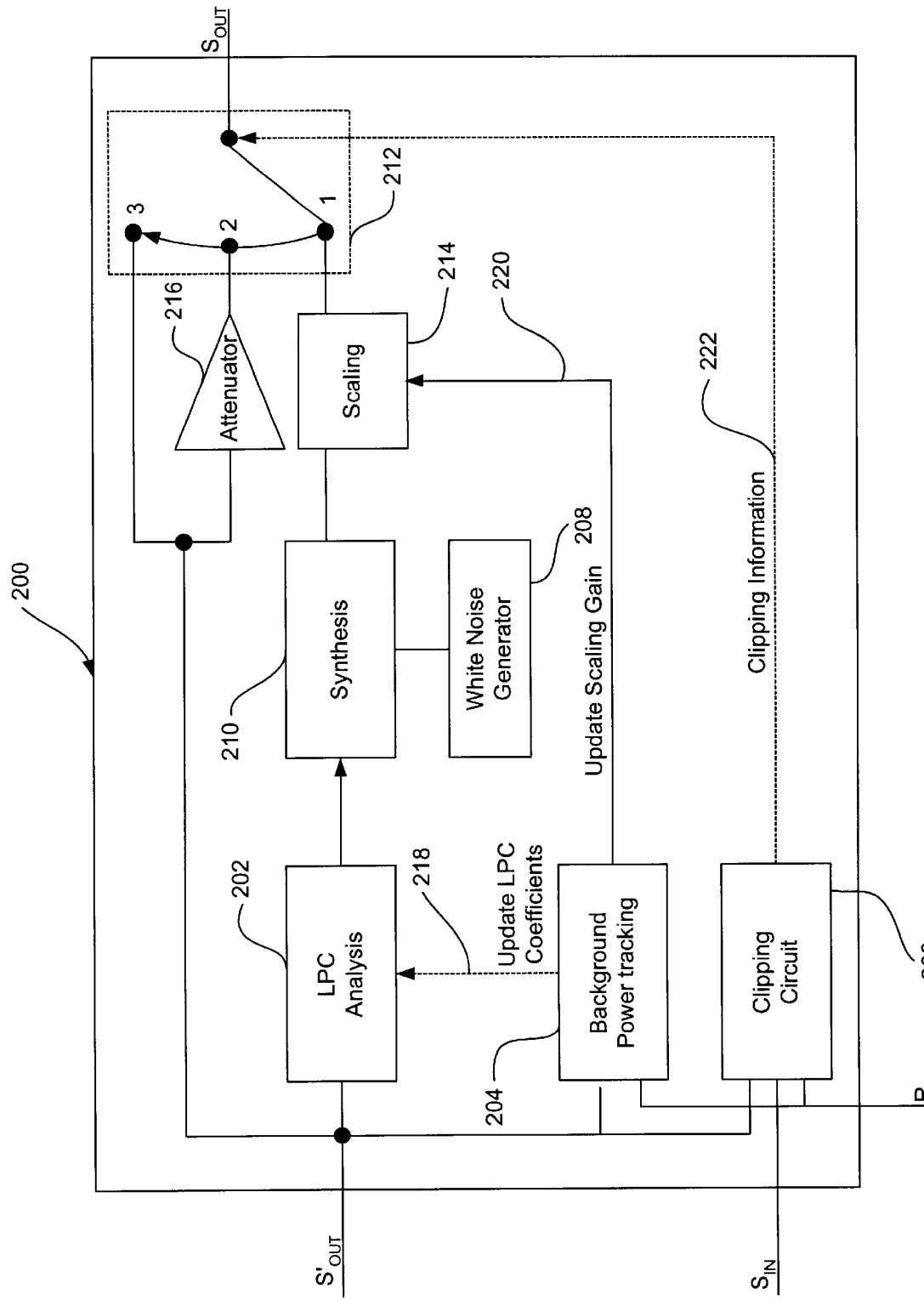
FIG. 2 is a diagram illustrating a comfort noise generation module in accordance with a preferred embodiment of the present invention.

Referring now to FIG. 2, a comfort noise generator 200 includes a LPC analysis module 202, a background power-tracking module 204, a clipping circuit 206, a white noise generator 208, a synthesis module 210, a scaling module 214, an attenuator 216, and a switch 212.

The LPC analysis module 202 receives the residual signal and a control signal 218, which indicates whether the LPC coefficients need to be updated. The LPC analysis module 202 may be any module capable of generating LPC coefficients. For example, if x(n) is the input signal, then the LPC analysis module 202 may predict the sample using previous samples. If $\hat{x}(n)$ is the predicted value of x(n), then the prediction equation may be:

$$\hat{x}(n) = \sum_{k=1}^{L} a_k x(n-k) \quad (1)$$

The coefficient $a_k$ is the prediction coefficients and L is the prediction order. For a speech signal, L may be set to any convenient value, for example, 10. However, other values of the prediction order are possible.

The LPC coefficients may be computed based on current small block of samples, for example, using the Levinson-Durbin algorithm. The algorithm first computes auto-correlation coefficients. The auto-correlation coefficients may be computed using any method, for example, $$r(k) = \sum_{i=0}^{N} x(i)x(k-i), k = 0, 1, \ldots, L \quad (2)$$

where N is the number of samples used to calculated auto correlation. An example of N may be 180. Window techniques may be also applied to x(i) before computing r(k), for example, a 180 sample Hamming window.

The LPC analysis module 202 then may then solve the following equation:

$$\begin{bmatrix} r(0) & r(1) & r(2) & \ldots & r(L) \\ r(1) & r(0) & r(1) & \ldots & r(L-1) \\ \ldots & & & & \\ r(L) & r(L-1) & r(L-2) & \ldots & r(0) \end{bmatrix} \begin{bmatrix} a_1 \\ a_2 \\ \ldots \\ a_L \end{bmatrix} = \begin{bmatrix} r(1) \\ r(2) \\ \ldots \\ r(L+1) \end{bmatrix} \quad (3)$$

Where r(k) are auto-correlation coefficients and are computed based on current block of samples.

The background power-tracking module 204 may receive the far-end signal as inputs and determine two control signals: an update LPC coefficients signal 218 and an update scaling gain signal 220. If the update coefficients signal 218 is activated, the LPC analysis module 202 is instructed to perform an update on the LPC coefficients. If the update scaling gain signal 220 is activated, the scaling module 214 is instructed to update the scaling gain.

For example, a current local minimum of the power of the noise is determined for every time period T. For example T may be between 5 and 30 seconds. Of course, other values of T are possible. If the current minimum of the power of the noise is lower than predetermined threshold and closer to the previous minimum of the power of the noise by a threshold, the update LPC coefficients signal 218 and the update gain scaling signal 220 are activated.

The clipping circuit 206 determines whether the noise is present at the input signal and speech on the far-end signal ("a hard-clipping condition"). The clipping circuit 206 also determines a soft-clipping condition, i.e. attenuation, when the ratios are marginally around the thresholds. The clipping circuit 206 also determines whether neither a hard-clipping condition nor a soft-clipping condition exists. The decision as to what type of clipping, if any, is present is made, for example, by determining the power levels of the near-end-signal, the far-end signal, and the residual signal, taking the ratios of these powers, and determining whether the ratios are greater or less than predetermined constants.

For example, the ratio of the near-end signal power over the residual signal power is determined and seen whether it is greater than or equal to a threshold, for example 20 dB. Other examples of ratios and threshold values are possible.

The white noise generator 208 may be any conventional generator of white noise. For example, the white noise generator 208 may be the same as that described in ITU-T G.723.1 or G.729. Other examples of white noise generators are possible.

The synthesis module 210 performs a synthesis operation using the signal from the white noise generator 208 plus the synthesized noise signal, which is obtained using the LPC coefficients supplied by the LPC analysis module 202. The synthesis filter module 210 is given by:

$$\frac{1}{1-A(z)} = \frac{1}{1-\sum_{i=1}^{p} a_k z^{-k}} \quad (4)$$

where $a_k$ are the LPC coefficients derived from LPC analysis module 202.

The output of the synthesis module 210 is given by $$\text{CN\_noise}(n) = wn + \sum_{k=1}^{p} a_k \text{CN\_noise}(n-k) \quad (5)$$

where CN_noise(n) is the synthesized comfort noise and wn is the generated noise sample.

The scaling module 214 may be any device or method that performs gain scaling on the input signal. For example, the magnitude of the input signal may be multiplied by a factor, which is tracked in module 204 and matches the background noise level.

The attenuator 216 may be any type of device that takes an input signal and performs attenuation of that input signal if soft-clipping is determined. For example, the attenuator 216 may attenuate the input signal by 20 dB.

The switch 212 is any conventional switch that routes multiple inputs to a single output. The switch 212 may be a multiplexor, for example.

In operation, the background power-tracking module 204 receives the residual signal and the far-end signal. The background power-tracking module 204 determines a local minimum of the power of the noise is determined for every time period T. If the current minimum is lower than pre-set threshold and closer to the previous minimum of the power of the noise by a threshold, the update LPC coefficients signal 218 and the update gain scaling signal 220 are activated (e.g., set to true) by the background power-tracking module 204. The background noise level may be recorded for level scaling in module 214.

The LPC analysis module 202 determines LPC coefficients and determines new coefficients when instructed to do so by the update LPC coefficients signal 218. The synthesis module 210 combines the white noise generated by the white noise generator 208 with the predicted noise (using the LPC coefficients) to create a comfort noise signal. The comfort noise signal is scaled by the gain scaling module 214. This gain updated in background power-tracking module 204 represents the background noise level.

The clipping circuit 206 sends a clipping information signal 222 which determines which position to set the switch 212 (1, 2, or 3). The clipping module 206 also sends enable/disable signals to synthesis module 210. If hard-clipping is not registered, it is not necessary to do synthesis. The clipping circuit 206 determines this position based upon whether a hard-clipping condition, a soft-clipping condition, or neither a hard-clipping condition nor a soft-clipping condition exists. A hard-clipping condition may include, for example, when the near-end signal is noise or silence and the far-end-signal speech or noise. Other examples of hard-clipping conditions are possible. A soft-clipping condition may exist when it is hard to determine whether the near-end signal is noise or silence. Other examples of soft-clipping conditions are also possible.

If the clipping circuit 206 determines a hard-clipping condition exists, then the switch 212 is set to position "1" and the comfort noise signal is switched through to the output. This signal becomes the output signal.

If the clipping circuit 206 determines that a soft-clipping condition exists, then the switch 212 is placed in position "2". If in position "2", an attenuated residual signal (going through the attenuator 216) is sent to the output. This signal becomes the output signal.

If the clipping circuit 206 determines that neither hard-clipping nor soft-clipping is occurring the switch 212 is placed in position "3". If this is the case, then the residual signal becomes the output signal.

Figure 3:
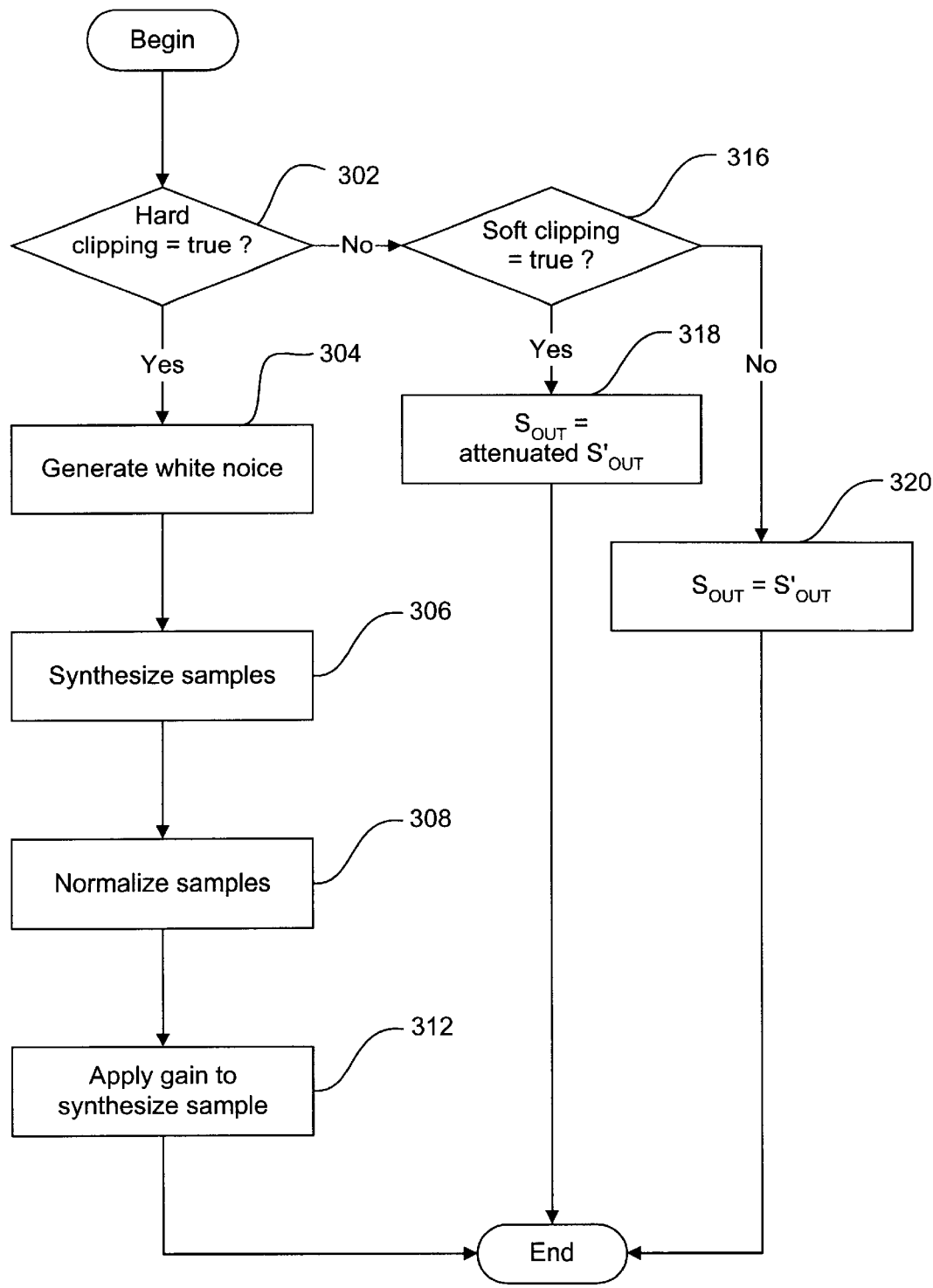
FIG. 3 is a flowchart illustrating aspects of the operation of comfort noise generation module in accordance with a preferred embodiment of the present invention.

Referring now to FIG. 3, aspects of the operation of the present invention is illustrated. At step 302, the system determines whether a hard-clipping flag has been set to true. This flag may, for example, be generated by the background power-tracking module 204 of FIG. 2 and indicate whether a hard-clipping condition exists. If the hard-clipping flag is true, then, at step 304 a white noise generator generates noise. At step 306, the comfort noise sample is synthesized. For example, the equation (5) may be used to generate the comfort noise sample. At step 308, the sample is normalized. For example, the equation:

$$\text{CN\_noise}(n) = \frac{\text{CN\_noise}(n)}{\text{average}\{C\_\text{noise}(n)\}} \quad (6)$$

where this average {CN_noise(n)} may be calculated using the square root of equation (7).

At step 312, the gain is applied to the comfort noise signal for example, the gain multiplied by the comfort noise signal (the synthesized signal).

If the answer at step 302 is negative, then at step 316, the system determines whether soft-clipping is occurring. If the answer is affirmative, then at step 318 the output is set to an attenuated value of the residual signal.

If the answer at step 316 is negative, the output is set equal to the residual signal. In other words, no attenuation or synthesizing is performed.

Figure 4:
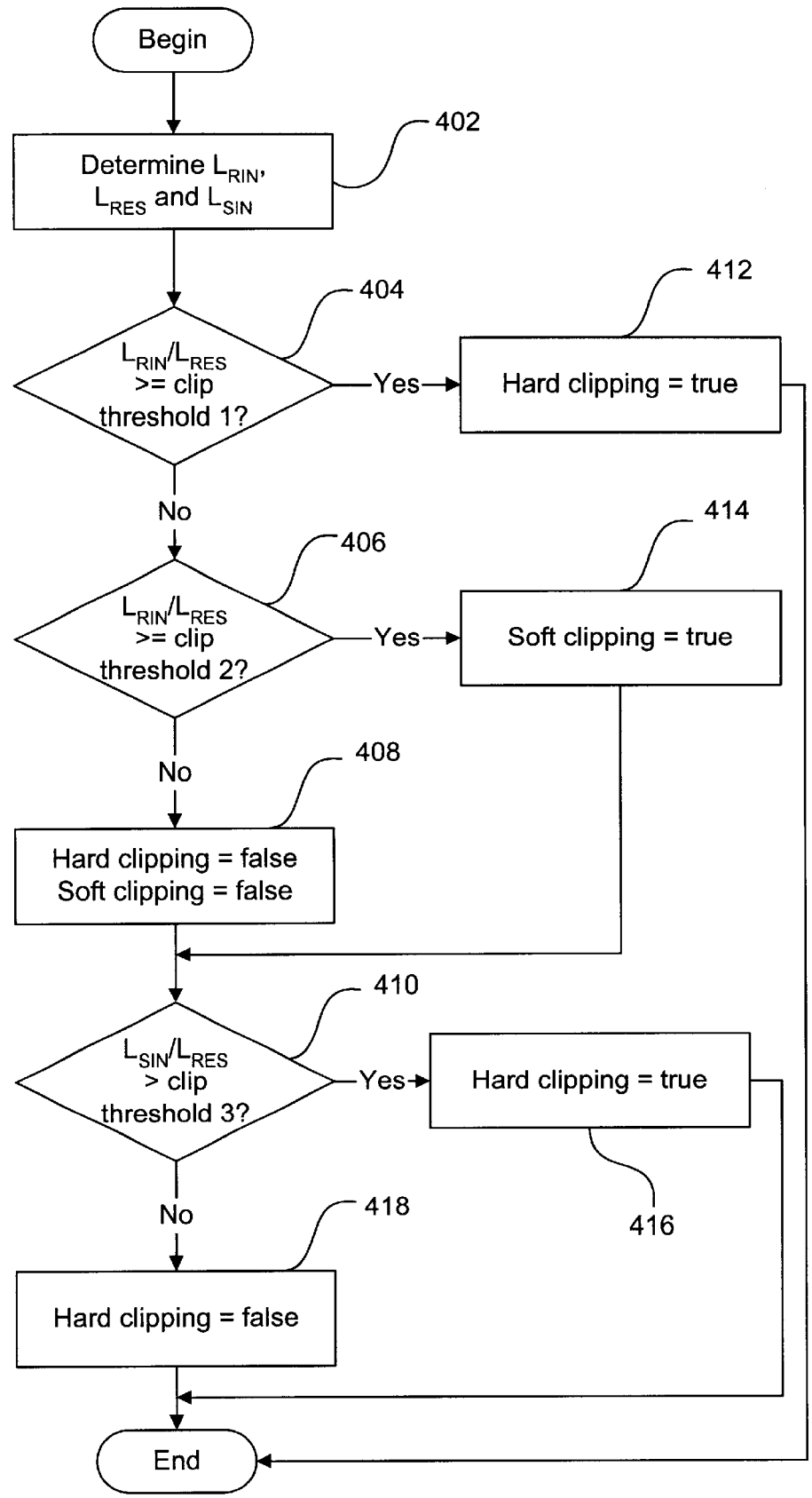
FIG. 4 is a flowchart illustrating aspects of the operation of comfort noise generation module in accordance with a preferred embodiment of the present invention.

Referring now to FIG. 4, the operation of a clipping circuit is described. The algorithm uses a hard-clipping flag and a soft-clipping flag to indicate the occurrence of a hard-clipping and soft-clipping condition, respectively. At step 402, the clipping circuit determines the power of the near-end signal, the far-end signal, and the residual signal. At step 404, the clipping circuit determines the ratio of the far-end signal power to the residual signal power and determines whether it is greater than or equal to a threshold, for example, 26 dB. If the answer at step 404 is affirmative, then at step 412 the hard-clipping flag is set to be true and ends.

If the answer at step 404 is negative, then at step 406, the ratio of the near-end signal power to the residual signal power is compared to a second threshold, for example 20 dB. The second threshold is set to a value somewhat less than the first threshold because this is to test for a soft-clipping condition.

If the answer at step 406 is affirmative, then at step 414, the soft-clipping flag is set to be equal to true. Execution then continues at step 410. If the answer at step 406 is negative then at step 408, both the hard-clipping flag and the soft-clipping flag are set to be false.

At step 410, the clipping circuit determines the ratio of the near-end signal power to the residual signal power and determines whether this ratio is greater than or equal to a third threshold, for example, 20 dB. If the answer at step 410 is affirmative, then at step 416, the hard-clipping flag is set equal to true. If the answer at step 410 is negative, then at step 418 the hard-clipping flag is again set to false. The hard-clipping flag and the soft-clipping flag may be used to set to the switch 212 of FIG. 2, for example, and are used to set the switch as described elsewhere in this specification.

Figure 5:
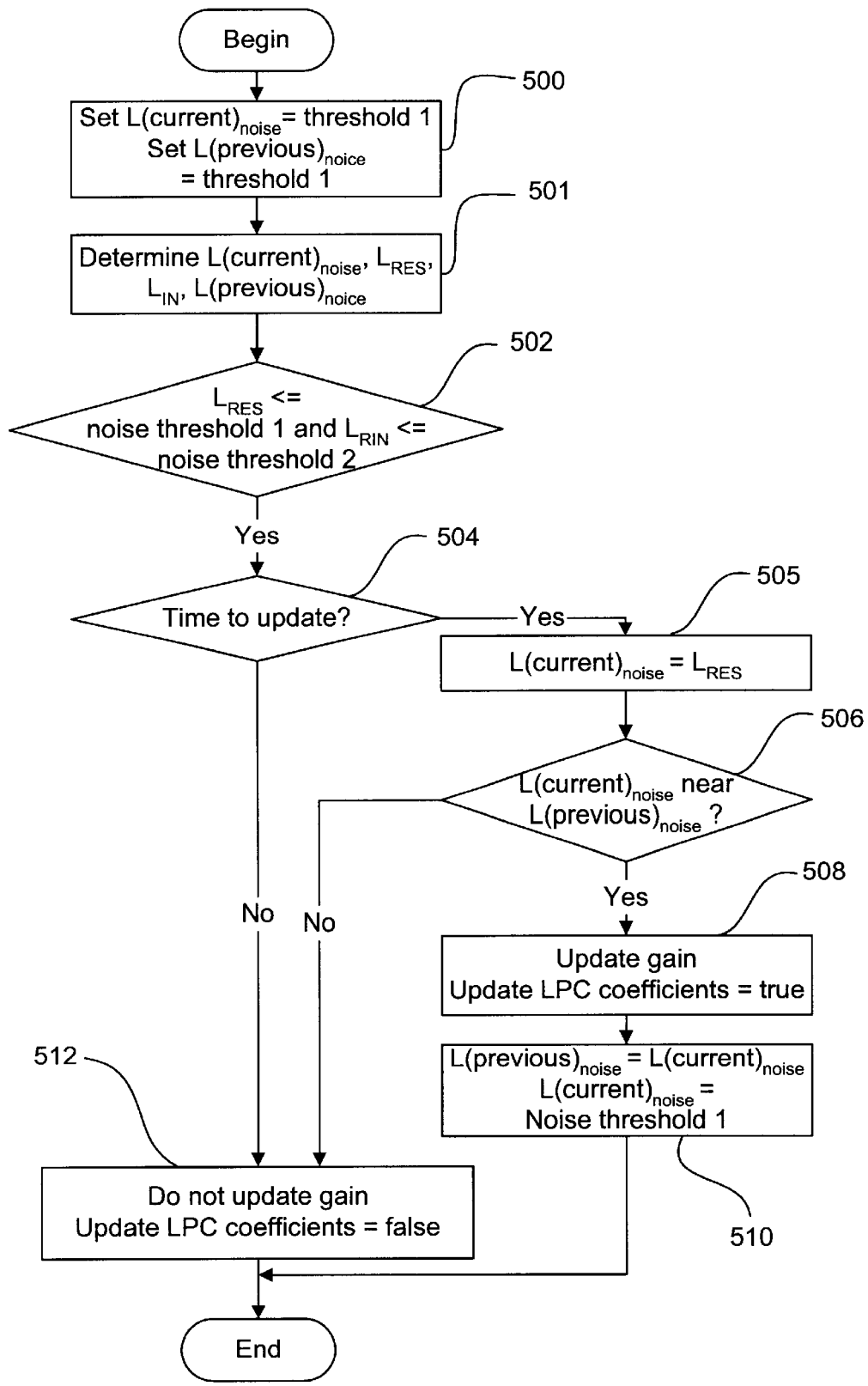
FIG. 5 is a flowchart illustrating aspects of the operation of comfort noise generation module in accordance with a preferred embodiment of the present invention.

Referring now to FIG. 5, the operation of a background power-tracking module is described. The algorithm may update the gain to reflect that the gain of the comfort noise signal and use an update LPC coefficients flag to indicate that the LPC coefficients should be updated. Of course, the algorithm may use other flags or no flags and the inclusion of these two flags in this specification is for illustrative purposes only. $L(current)_{noise}$ and $L(previous)_{noise}$ are variables that may be reset each time the algorithm of FIG. 5 is executed. Of course, these two variables may be omitted or replaced, depending upon the actual implementation of FIG. 5.

At step 500, the value of $L(current)_{noise}$ and $L(previous)_{noise}$ are set to the first threshold. At step 501, the power of the current residual signal ("power of the current residue signal"), and the power of the near-end signal ($L_{sin}$) are determined. The power of the noise signal for previous period, which may be stored in a memory ("the power of the previous noise signal") is obtained. The noise power level may be calculated as follows, $$L=ax^2+(1-\alpha)L \qquad (7)$$

where L is the power level and x is the input signal. Here ($\alpha$ is a small number, e.g. 1/128. The equation (7) may be used to compute all the power levels, such as near-end $L_{sin}$, far-end $L_{rin}$, and residual $L_{res}$. The x will be corresponding input signal, such as near-end signal, far-end signal, and residual signal respectively.

At step 502, it is determined whether the power of the residual signal is less than a first threshold and the power of the far-end signal is less than a threshold. For example, the first threshold may be set to a value of 38 bB and the second threshold is set to a value of 58 db. This step determines whether silence or noise may exist as the near-end signal, and may reflect the value set in a standard, for example G.168. Of course, other values for thresholds are possible.

At step 504, the module determines whether an update is needed after a given time period. For example, a count variable may be checked to see if the count has reached a certain limit, which indicates the end of a predetermined period has been reached. The predetermined period may take on any value, but, in one example, is from 5 to 30 seconds.

If the answer at step 504 is negative, then at step 512, the gain is not updated and the update LPC coefficients flag is set to be false. These flags may be sent to the LPC analysis module and the gain module, respectively.

If the answer at step 504 is affirmative, then at step 505, $L(current)_{noise}=L_{res}$. At step 506, it is determined whether the power of the current tracked noise signal is near (within a threshold) the previous tracked noise signal. For example, it may be determined whether the power of the current noise signal is within plus or minus 1.5 db of the previous noise signal. If the answer at step 506 is negative, then execution continues at step 512. If the answer at step 506 is affirmative, then at step 508, the gain is not updated and the update LPC coefficient flag is set to be true. At step 510, value for the noise of the previous signal is set equal to the power of the noise for the current signal and the power of the noise current signal is set to be the first noise threshold. Execution then ends.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for comfort noise insertion may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for creating a comfort noise signal, said system comprising:
   a clipping circuit, said clipping circuit receiving a near-end signal, a far-end signal and a residual signal, said clipping circuit determining the power of said far end signal, the power of said near-end signal and the power of said residual signal, said clipping circuit generating a clipping information signal;
   a comfort noise determination block including an LPC analysis module, wherein said comfort noise determination block also receives said residual signal for selectively forming a comfort noise signal; and
   a switch coupled to said comfort noise determination block and said clipping circuit, wherein said switch is activated by said clipping information signal to selectively transmit said comfort noise signal.

2. The system of claim 1 wherein said comfort noise determination block forms at least one LPC coefficient.

3. The system of claim 1 wherein said comfort noise determination block includes a white noise generator, and a scaler.

4. The system of claim 1, wherein said clipping information signal is generated in response to a ratio of said power of said near end signal to said power of said residual signal.

5. The system of claim 4, wherein said clipping information signal activates said switch to transmit said comfort noise signal whenever said ratio is not less than a predetermined threshold.

6. The system of claim 1, wherein said clipping information signal is generated in response to a ratio of said power of said far end signal to said power of said residual signal.

7. The system of claim 6, wherein said clipping information signal activates said switch to transmit said comfort noise signal whenever said ratio is not less than a predetermined threshold.

8. A system for creating a comfort noise signal, said system comprising:

a clipping circuit, said clipping circuit receiving a near-end signal, a far-end signal and a residual signal, said clipping circuit determining the power of said far end signal, the power of said near-end signal and the power of said residual signal, said clipping circuit determining the ratio of said power of said near end signal to said residual signal and whether said ratio is less than a predetermined threshold;

a comfort noise determination block coupled to said residual signal for selectively forming a comfort noise signal;

a switch coupled to said comfort noise determination block and said clipping circuit, wherein said switch is activated to transmit said comfort noise signal whenever said ratio of said power of said near-end signal to said residual signal is not less than said predetermined threshold; and a background power-tracking module, said background power-tracking module coupled to said comfort noise determination block, said residual signal and said far-end signal, said background power-tracking module determining the power of said residual signal at a first time, the power of said residual signal at a second time, comparing the power of said residual signal at said first time with the power of said residual signal at said second time, and, based upon said determination, sending a signal to said comfort noise determination block to update said comfort noise signal.

9. The system of claim 8 further comprising an LPC analysis module.

10. A system for generating a comfort noise signal comprising:
a LPC analysis module;
a background power checking module coupled to said LPC analysis module and a residual signal;
a clipping circuit coupled to a near-end signal, a far-end signal, and said far-end signal, said clipping circuit determining whether a hard-clipping condition exists and also determining whether a soft-clipping condition exists;
a synthesis circuit coupled to said LPC analysis module and a white noise generator, said synthesis circuit forming a comfort noise signal from information supplied by said LPC analysis module and said white noise generator;
a scaling circuit coupled to said synthesis circuit for receiving the comfort noise signal produced by said synthesis circuit and scaling said comfort noise signal;
an attenuator, said attenuator coupled to said residual signal, said attenuator producing an attenuated signal; and
a switch, said switch transmitting said comfort noise signal upon the determination of said hard-clipping condition, said switch transmitting said attenuated signal upon the detection of said soft-clipping condition, and said switch passing said input signal upon the detection of neither said hard-clipping condition and said soft-clipping condition.

11. A method comprising:
receiving a near-end signal and determining the power of said near-end-signal;
receiving a far-end signal and determining the power of said far-end signal;
receiving a residual signal, said residual signal being the difference between said near-end signal and an estimated echo, and determining the power of said residual signal;

determining whether said near-end signal is in a hard-clipping condition based upon said power levels of said near-end signal, far end signal, and residual signal;

determining whether said near-end signal is in a soft-clipping condition based upon said power levels of said near-end signal, far end signal, and residual signal;

forming at least one LPC coefficient in response to receiving an input signal, said at least one LPC coefficient representative of said input signal;

forming a comfort noise signal, said comfort noise signal based at least in part on said at least one LPC coefficient and white noise;

transmitting the comfort noise signal to a receiver if said near-end signal is in a hard-clipping condition;

attenuating the input signal and transmitting the attenuated signal if said near-end signal is in a soft-clipping condition; and outputting the input signal if the input signal is not in a hard-clipping condition and not in a soft-clipping condition.

12. The method of claim 7 further comprising scaling the comfort noise signal.

13. The method of claim 7 further comprising the step of determining whether to update said LPC coefficients.

14. The method of claim 7 wherein said step of generating at least one LPC coefficient uses an LPC polynomial of order 10.

15. A system for creating a comfort noise signal comprising:
means for receiving a near-end signal and determining the power of said near-end-signal;
means for receiving a far-end signal and determining the power of said far-end signal;
means for receiving a residual signal, said residual signal being the difference between said near-end signal and an estimated echo, and determining the power of said residual signal;
means for determining whether said near-end signal is in a hard-clipping condition based upon said power levels of said near-end signal, far end signal, and residual signal;
means for determining whether said near-end signal is in a soft-clipping condition based upon said power levels of said near-end signal, far end signal, and residual signal;
means for forming at least one LPC coefficient in response to receiving an input signal, said at least one LPC coefficient representative of said input signal;
means for forming a comfort noise signal, said comfort noise signal based at least in part on said at least one LPC coefficient and white noise;
means for transmitting the comfort noise signal to a receiver if said near-end signal is in a hard-clipping condition;
means for attenuating the input signal and transmitting the attenuated signal if said near-end signal is in a soft-clipping condition; and
means for outputting the input signal if the input signal is not in a hard-clipping condition and not in a soft-clipping condition.

16. A computer program for creating a comfort noise signal comprising:
first code for receiving a near-end signal and determining the power of said near-end-signal;

second code for receiving a far-end signal and determining the power of said far-end signal;

third code for receiving a residual signal, said residual signal being the difference between said near-end signal and an estimated echo, and determining the power of said residual signal;

fourth code for determining whether said near-end signal is in a hard-clipping condition based upon said power levels of said near-end signal, far end signal, and residual signal;

fifth code for determining whether said near-end signal is in a soft-clipping condition based upon said power levels of said near-end signal, far end signal, and residual signal;

sixth code for forming at least one LPC coefficient in response to receiving an input signal, said at least one LPC coefficient representative of said input signal;

seventh code for forming a comfort noise signal, said comfort noise signal based at least in part on said at least one LPC coefficient and white noise;

eighth code for transmitting the comfort noise signal to a receiver if said near-end signal is in a hard-clipping condition;

ninth code for attenuating the input signal and transmitting the attenuated signal if said near-end signal is in a soft-clipping condition; and tenth code for outputting the input signal if the input signal is not in a hard-clipping condition and not in a soft-clipping condition.

17. A computer readable medium having stored therein instructions for causing a processing unit to execute the following method:

receiving a near-end signal and determining the power of said near-end-signal;

receiving a far-end signal and determining the power of said far-end signal;

receiving a residual signal, said residual signal being the difference between said near-end signal and an estimated echo, and determining the power of said residual signal;

determining whether said near-end signal is in a hard-clipping condition based upon said power levels of said near-end signal, far end signal, and residual signal;

determining whether said near-end signal is in a soft-clipping condition based upon said power levels of said near-end signal, far end signal, and residual signal;

forming at least one LPC coefficient in response to receiving an input signal, said at least one LPC coefficient representative of said input signal;

forming a comfort noise signal, said comfort noise signal based at least in part on said at least one LPC coefficient and white noise;

transmitting the comfort noise signal to a receiver if said near-end signal is in a hard-clipping condition;

attenuating the input signal and transmitting the attenuated signal if said near-end signal is in a soft-clipping condition; and outputting the input signal if the input signal is not in a hard-clipping condition and not in a soft-clipping condition.

18. A method comprising receiving a near-end signal, a far-end signal and a residual signal;

determining the power of said far end signal, the power of said near-end signal and the power of said residual signal;

determining whether a hard-clipping condition exists based at least in part upon the ratio of said power of said near end signal to said residual signal;

forming a comfort noise signal using an LPC polynomial; and transmitting said comfort noise signal to a receiver whenever an occurrence of said hard-clipping condition is determined.

19. The method of claim 18 wherein said LPC polynomial is of order 10.

20. The method of claim 18 comprising the further steps of determining a plurality of LPC coefficients and updating said coefficients.

21. The method of claim 18 comprising the further step of scaling said comfort noise signal.

22. A system for creating a comfort noise signal comprising:

means for receiving a near-end signal, a far-end signal and a residual signal;

means for determining the power of said far end signal, the power of said near-end signal and the power of said residual signal;

means for determining whether a hard-clipping condition exists based at least in part upon the ratio of said power of said near end signal to said residual signal;

means for forming a comfort noise signal based at least in part on LPC coefficients; and means for transmitting said comfort noise signal to a receiver whenever an occurrence of said hard-clipping condition is determined.

23. A computer program for creating a comfort noise signal comprising:

first code for receiving a near-end signal, a far-end signal and a residual signal;

second code for determining the power of said far end signal, the power of said near-end signal and the power of said residual signal;

third code for determining whether a hard-clipping condition exists based at least in part upon the ratio of said power of said near end signal to said residual signal;

fourth code for forming a comfort noise signal based at least in part on LPC coefficients; and fifth code for transmitting said comfort noise signal to a receiver whenever an occurrence of said hard-clipping condition is determined.

24. A computer readable medium having stored therein instructions for causing a processing unit to execute the following method:

receiving a near-end signal, a far-end signal and a residual signal;

determining the power of said far end signal, the power of said near-end signal and the power of said residual signal;

determining whether a hard-clipping condition exists based at least in part upon the ratio of said power of said near end signal to said residual signal;

forming a comfort noise signal based at least in part on LPC coefficients; and transmitting said comfort noise signal to a receiver whenever an occurrence of said hard-clipping condition is determined.

* * * * *